(12) United States Patent
Bisheh Niasar et al.

(10) Patent No.: US 12,585,832 B2
(45) Date of Patent: Mar. 24, 2026

(54) LATTICE BASED CRYPTOGRAPHIC REJECTION BOUNDED SAMPLING

(71) Applicant: Microsoft Technology Licensing, LLC, Redmond, WA (US)

(72) Inventors: Mojtaba Bisheh Niasar, Dover, NH (US); Bharat S. Pillilli, El Dorado Hills, CA (US); Michael Jeffrey Norris, Folsom, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 18/657,470

(22) Filed: May 7, 2024

(65) Prior Publication Data

US 2025/0348623 A1     Nov. 13, 2025

(51) Int. Cl.
*G06F 21/72*     (2013.01)
*G06F 21/60*     (2013.01)

(52) U.S. Cl.
CPC ............ *G06F 21/72* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 8,611,451 B1 * | 12/2013 | Sedarat ................. | H04B 17/13 |
| | | | 455/516 |
| 2013/0285766 A1 * | 10/2013 | Mallinson ............ | H03H 7/0138 |
| | | | 708/190 |
| 2014/0177699 A1 * | 6/2014 | Tan ................... | H04L 25/03343 |
| | | | 375/233 |

* cited by examiner

*Primary Examiner* — Nelson S. Giddins
(74) *Attorney, Agent, or Firm* — Schwegman Lundberg & Woessner, P.A.

(57)     ABSTRACT

A cryptographic rejection sampling unit includes n parallel rejection bounded sampling circuits coupled to receive n, four-bit samples in a cycle from a buffer containing a random bit string, where n is an integer having a value of at least 8. A first in-first out queue is coupled to receive valid output from the rejection bounded circuits. A multiplexer is coupled to the queue and configured to provide four valid coefficients in the cycle. A controller is coupled to control valid output provided from the queue to the multiplexer, to track a number of valid outputs in the queue, and to control the multiplexer to output the four valid coefficients. A method uses the cryptographic rejection sampling unit to generate and write the valid coefficients to a memory.

20 Claims, 7 Drawing Sheets

200

| B·(4-BIT·INPUT) | B·MOD·5 | 2-(B·MOD·5) | VALID/INVALID | OUTPUT·MOD·Q |
|---|---|---|---|---|
| 0 | 0 | 2 | VALID | 2 |
| 1 | 1 | 1 | VALID | 1 |
| 2 | 2 | 0 | VALID | 0 |
| 3 | 3 | -1 | VALID | 8380416 |
| 4 | 4 | -2 | VALID | 8380415 |
| 5 | 0 | 2 | VALID | 2 |
| 6 | 1 | 1 | VALID | 1 |
| 7 | 2 | 0 | VALID | 0 |
| 8 | 3 | -1 | VALID | 8380416 |
| 9 | 4 | 2 | VALID | 8380415 |
| 10 | 0 | 2 | VALID | 2 |
| 11 | 1 | 1 | VALID | 1 |
| 12 | 2 | 0 | VALID | 0 |
| 13 | 3 | -1 | VALID | 8380416 |
| 14 | 4 | -2 | VALID | 8380415 |
| 15 | 0 | 2 | INVALID | INVALID |

| CYCLE COUNT | INPUT FROM PISO | FIFO VALID ENTRIES FROM PREVIOUS CYCLE | TOTAL VALID SAMPLES | OUTPUT | FIFO REMAINING FOR THE NEXT CYCLE |
|---|---|---|---|---|---|
| 0 | 8 | 0 | 8 | 4 | 4 |
| 1 | 8 | 4 | 12 | 4 | 8 |
| 2 | 8 | 8 | 16 | 4 | 12 (FULL) |
| 3 | 0 | 12 | 12 | 4 | 8 |
| 4 | 8 | 8 | 16 | 4 | 12 (FULL) |
| 5 | 0 | 12 | 12 | 4 | 8 |
| 6 | 8 | 8 | 16 | 4 | 12 (FULL) |
| 7 | 0 | 12 | 12 | 4 | 8 |
| 8 | 7 | 8 | 15 | 4 | 11 (FULL) |
| 9 | 0 | 11 | 11 | 4 | 7 |
| 10 | 6 | 7 | 13 | 4 | 9 (FULL) |

RECEIVE COEFFICIENT
SAMPLES

620

REJECTION SAMPLE
COEFFICIENTS IN PARALLEL

630

REDUCE MODULO 5 AND
SUBTRACT FROM η

640

WRITE VALID COEFFICIENTS
TO MEMORY

LATTICE BASED CRYPTOGRAPHIC REJECTION BOUNDED SAMPLING

BACKGROUND

The advent of quantum computers poses a serious challenge to the security of the existing public-key cryptosystems, as they can potentially be broken based on Shor's algorithm. Lattice-based cryptosystems are among the most promising post quantum computing (PQC) algorithms that are believed to be hard to crack for both classical and quantum computers.

SUMMARY

A cryptographic rejection sampling unit includes n parallel rejection bounded sampling circuits coupled to receive n, four-bit samples in a cycle from a buffer containing a random bit string, where n is an integer having a value of at least 8. A first in-first out queue is coupled to receive valid output from the rejection bounded circuits. A multiplexer is coupled to the queue and configured to provide four valid coefficients in the cycle. A controller is coupled to control valid output provided from the queue to the multiplexer, to track a number of valid outputs in the queue, and to control the multiplexer to output the four valid coefficients. A method uses the cryptographic rejection sampling unit to generate and write the valid coefficients to a memory.

BRIEF DESCRIPTION OF THE DRAWINGS

FIG. 2 is a table showing results and intermediate values calculated by a rejection sampling unit according to an example embodiment.

FIG. 5 is a table illustrating queue management and status according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Lattice-based cryptosystems are among the most promising PQC algorithms that are believed to be hard for both classical and quantum computers. RejBounded sampling is used to generate a random polynomial from a uniform distribution and check if each coefficient of the polynomial satisfies certain conditions.

A rejection bounded (RejBounded) sampling unit, which is referred to as Expand_S by NIST in the context of ML-DSA (Module Lattice Digital Signature Algorithm), plays a role in the key generation process. RejBounded is responsible for generating a secret key used in the digital signature process. It uses a lattice-based system, relying on mathematical structures known as lattices. The aim is to generate a secure key pair that can resist quantum attacks.

Figure 1:
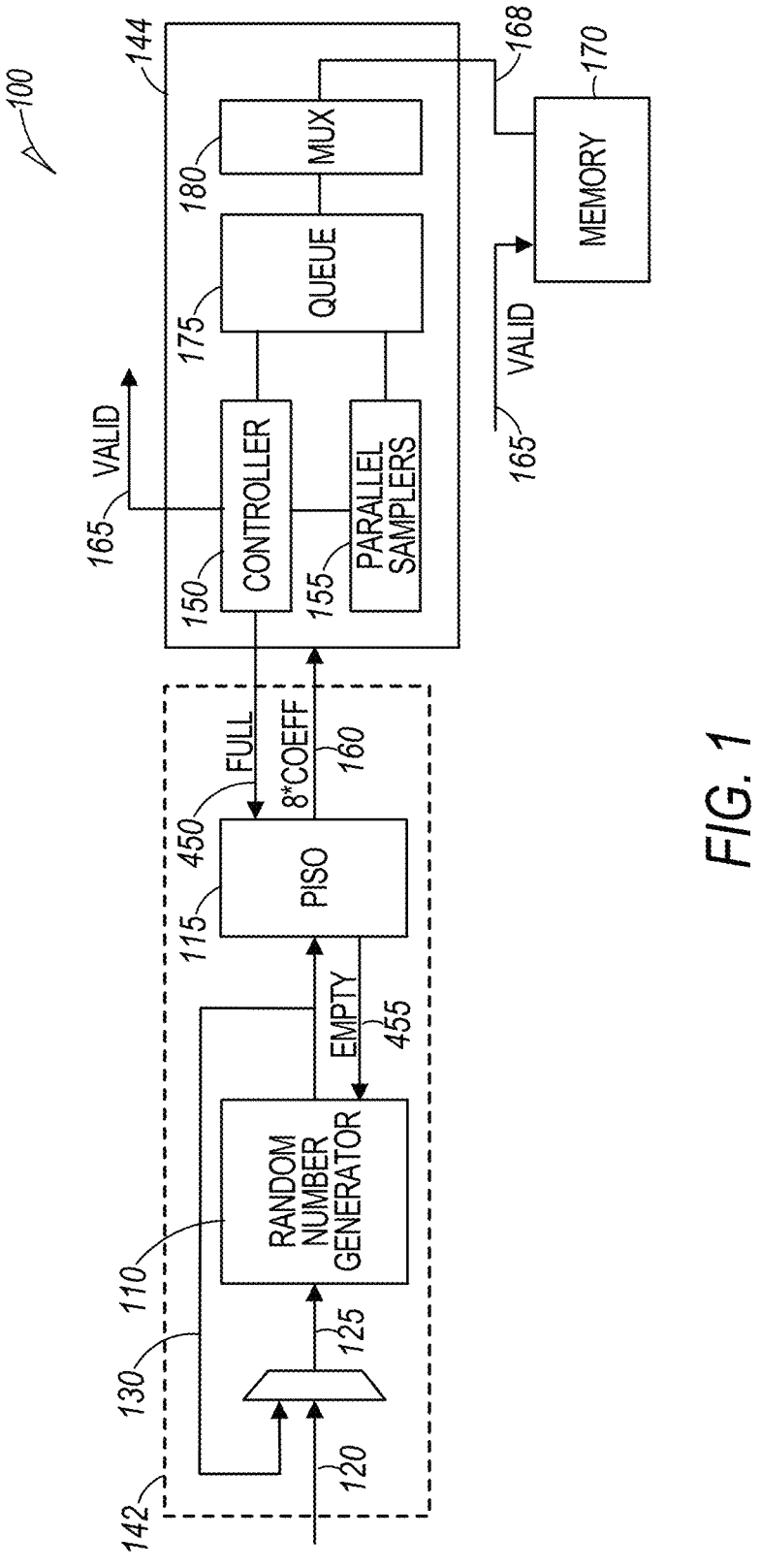
FIG. 1 is a high-level block flow diagram of an improved lattice-based cryptographic system according to an example embodiment.

FIG. 1 is a high-level block flow diagram of an improved lattice-based cryptographic system 100. System 100 includes a random number generator 110. A Keccak hash function may be used as random number generator 110. The random number generator 110 produces a random bit string that is stored in a buffer 115. Buffer 115 may be a parallel in, serial out (PISO) buffer in one example.

A seed, $\rho$ 120, is provided via a multiplexer 125 to the random number generator 110. A new seed is provided for each polynomial. The buffer 115 in one example is not large enough to buffer the number of bits needed for system 100 to process the coefficients of an entire polynomial, so a loop path 130 is provided back to the multiplexer 125 to prompt the random generator 110 to provide a next number of bits of the bitstream to butter 115 for a current polynomial until all the coefficients of the current polynomial are processed. In one example, the random number generator 110, buffer 115, multiplexer 125 and loop path 130 form a random number generator unit 142.

A key generation function may be invoked by a user or entity to generate a digital signature key pair. A RejBounded unit 144 samples polynomial coefficients that form a secret key from a bounded distribution. The RejBounded unit 144 ensures that the secret key remains within certain bounds, preventing excessive values that could compromise security. The bounded distribution ensures that the secret key is not too large or too small. A public key is derived from the secret key. The lattice structure ensures that the derived public key is computationally infeasible to reverse-engineer into the secret key.

The RejBounded unit 144, at a high level, includes a controller 150 and a set of rejection samplers 155 operating in parallel. The rejection samplers receive coefficients 160 from the buffer 115 and determine which coefficients are valid. The controller will generate a valid output 165 when a desired number of coefficients are found valid and provide the valid coefficients via connector 168 to a memory 170. The samplers 155 may provide the valid coefficients to a queue 175 that is coupled to a modular multiplexer 180 that selects coefficients to write to the memory.

The random number generator 110 is used to generate a random stream of bits. The random stream of bits are output from buffer 115 as bytes that are used to create a sequence of uniformly random positive numbers in a private key range $\{0, \ldots, 2\eta\}$ by performing the sampling via the RejBounded unit 144.

In one example, the output bytes are divided into lower and upper four bits that are interpreted as two integers having values in the set: $\{0, \ldots, 15\}$. In the case of $\eta=2$ for ML-DSA-87, an integer is accepted when it is less than 15 and then reduced modulo 5 to be in the range $\{0, \ldots, 4\}$. Finally, the polynomial coefficients are obtained by subtracting the positive numbers from $\eta$.

After sampling a polynomial with 256 coefficients, the random number generator 110 will be reseeded at 120, and a new random stream will be generated and will be sampled by RejBounded sampling unit 144.

The output of the sampling results in keys $s_1 \in R_q^l$ and $s_2 \in R_q^k$ while each polynomial includes 256 coefficients.

$$s_1 = \begin{bmatrix} s_{1,0} \\ \vdots \\ s_{1,l-1} \end{bmatrix}$$

$$s_2 = \begin{bmatrix} s_{2,0} \\ \vdots \\ s_{2,k-1} \end{bmatrix}$$

Rq is the ring of single-variable polynomials over Zq modulo $X^{256}+1$, also denoted by $Zq[X^{256}]/(X+1)$. Zq is the ring of integers modulo q, also denoted by Z/qZ.

The values of k and 1 are determined based on the security level of the system defined by NIST as follows:

| Algorithm Name | Security Level | k | 1 |
|---|---|---|---|
| ML-DSA-44 | Level-2 | 4 | 4 |
| ML-DSA-65 | Level-3 | 6 | 5 |
| ML-DSA-87 | Level-5 | 8 | 7 |

The random number generator 110 is used in a SHAKE-256 configuration for the RejBounded sampling operation. The function takes input data and generates a 1088-bit output after each round, where multiple rounds occur for a polynomial. In one example implementation of the random number generator 110, each round takes 12 cycles. The format of input data is as follows:

$$\text{Input data} = \rho \,|\, i$$

Where ρ is seed with 256-bits, i is a nonce value that is defined as follows:

$$i = \begin{cases} r & \text{for } s_{1,r} \\ r+l & \text{for } s_{2,r} \end{cases}$$

r is a loop value. Since each 4-bits is used for one coefficient, each round of the random number generator 110 output provides 1088/4=272 coefficients. To have 256 coefficients for each polynomial (with same seed and nonce), the random number generator 110 is rerun for at least 1 round.

There are two paths for the random number generator input. While the input 120 can be set by controller 150 for each new polynomial, the loop path 130 is used to rerun the random number generator 110 for completing the previous polynomial.

Designing the RejBounded sampler unit 144 to take all 1088-bit output parallelly would make a hardware architecture too costly and complex. The use of a parallel-input serial-output (PISO) unit for buffer 115 to store the random number generator 110 output and feed RejBounded unit 144 sequentially greatly decreases the complexity of the system 100.

The RejBounded sampler unit 144 takes data from the output of SHAKE-256 stored in the buffer 115. The number of cycles for the RejBounded unit 144 are variable due to the non-deterministic pattern of sampling. However, at least 1 random number generator 110 round is required to provide 256 coefficients. System 100 can be optimized and mapped to field programmable gate array (FPGA) and application specific integrated circuit (ASIC) platforms to develop highly efficient PQC architecture.

FIG. 2 is a table 200 showing results and intermediate values calculated by the RejBounded unit 144. The RejBounded unit 144 takes 4 bits of the random number generator 110 output from buffer 110. The decimal value of the input bits (b) is shown in column 210. For ML-DSA-87 scheme, the only rejected sample is input data equal to 15 which means the probability of rejection is $\frac{1}{16}$. Column 215 shows b mod 5 and column 220 shows 2-(bmod 5). Column 225 shows whether the input was valid or invalid. Note that the input value of 15 is shown as invalid. Colum 230 shows the output mod q.

Figure 3:
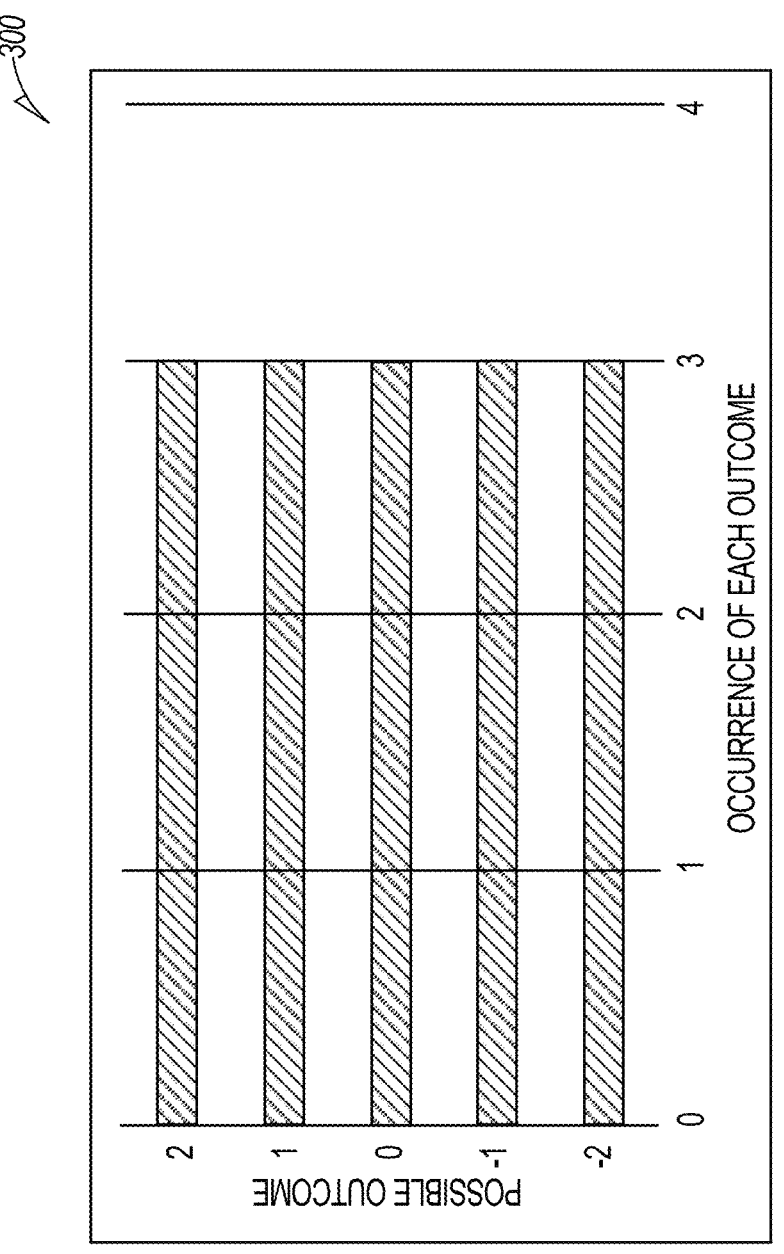
FIG. 3 shows a uniform distribution of possible outcomes of the rejection sampling unit according to an example embodiment.

FIG. 3 shows a uniform distribution of possible outcomes at 300. Each possible outcome as shown in column 220 as 2, 1, 0, −1, or −2 has the same probability. The reason to reject input with a value of 15 is to provide a uniform distribution that has the same probability for each output value.

Figure 4:
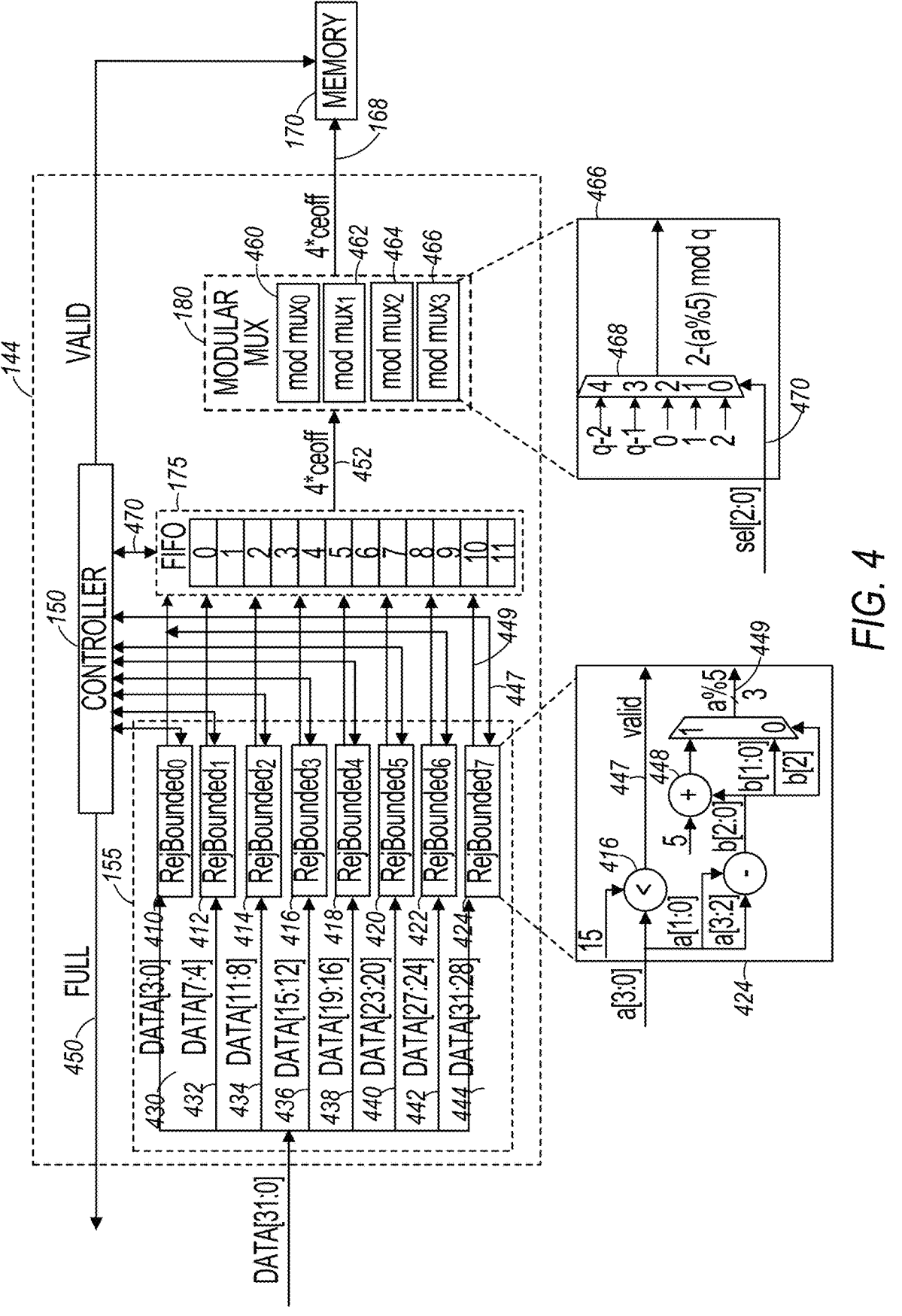
FIG. 4 is a block diagram showing details of the rejection sampling unit according to an example embodiment.

FIG. 4 is a block diagram showing RejBounded unit 144 in further detail. System 100 includes the RejBounded unit 144 operating in parallel with the random number generator unit 142. The latency for RejBounded unit 144 is absorbed within the latency for the random number generator unit 142 that includes a Keccak hash function as random number generator 110.

In one example, n=4 coefficients are handled per cycle. The use of four coefficients helps to avoid memory access challenges and make the control logic less complicated. The optimal speed of the RejBounded sampling unit 144 is to sample four coefficients without rejection in one cycle.

On the output side, as the RejBounded sampling unit 144 may fail, the rejection rate for each input is:

$$\text{rejection}_{rate} = \frac{1}{16} = 0.0625$$

The probability of failure to provide four appropriate coefficients from four inputs is:

$$1 - (1 - \text{rejection\_rate})^4 = 0.2275$$

To reduce the failure probability and avoid any wait cycle in polynomial multiplication, eight coefficients 160 are fed into the RejBounded unit 144 while only four of them will be passed via connector 168 to the memory 170 for polynomial multiplication. As such, the probability of failure is reduced to:

$$1 - (\text{probability of having 5 good inputs}) -$$

$$(\text{probability of having 4 good inputs}) =$$

$$1 - (1 - \text{rejection}_{rate})^5 - \text{rejection}_{rate} *$$

$$\binom{5}{4}(1 - \text{rejection}_{rate})^4 = 0.0344$$

The following table shows the probability of failure for the RejBounded unit 144 that performs four samplings per cycle:

| Sample number in input | Failure probability of 4 valid output |
| --- | --- |
| 4 | 0.2275238037109375 |
| 5 | 0.034404754638671875 |
| 6 | 0.004229903221130371 |
| 7 | 0.0004580467939376831 |
| 8 | 4.549999721348286e−05 |

The use of queue 175 in the form of a first in-first out (FIFO) queue to store the remaining unused valid output of sampling corresponding to valid coefficients, increases the probability of having four appropriate coefficients to match polynomial multiplication throughput.

Rejection samplers 155 include eight rejection sampler circuits 410, 412, 414, 416, 418, 420, 422, and 424, each corresponding to a respective 4-bit input 430, 432, 434, 436, 438, 440, 442, and 444. The rejection sampler circuits operate in parallel and each rejection sampler circuit checks if each of these coefficients should be rejected or not.

Detail of rejection sampler circuit 424 is shown in further detail in a blown up representation and includes a first check 446 that the input is less than 15. If so, a valid indication 447 is provided to the controller 150. The input four bits to rejection sampler circuit 444 is also reduced modulo 5 at 448 and subtracted from η, which is 2 in one example to provide an output 449 for storage in queue 175 if valid.

The valid input coefficients will be processed and the output 448, a result between [−η, η] (η is 2 for ML-DSA-87) will be stored into the FIFO queue 175. While a maximum 8 coefficients can be fed into FIFO queue 175, there are four more entries for the remaining coefficients from the previous cycle.

Modular multiplexer 180 receives the output from queue 175 via line 452. In one example, the modular multiplexer 180 includes four mod mux circuits 460, 462, 464, and 466, with mod mux circuit 466 shown in further detail. Mod mux circuit 466 contains a multiplexer 468 with five values, {0, 1, 2, 3, 4} representing q−2, q−1, 0, 1, and 2, that are selected by the output from the queue 175 by controller 150 via a select line 470 to write the 2-(b mod 5) value as a valid coefficient to memory 170.

There are several scenarios for balanced throughput of RejBounded unit 144. At the very first cycle, or whenever the FIFO queue 175 is empty, the RejBounded sampling unit 144 may not provide all four coefficients to memory 170. The failure probability may be reduced by feeding eight coefficients. Instead of reducing the failure probability by adding more hardware cost, the VALID output 165 stops polynomial multiplier until all 4 required coefficients are sampled.

If more than four inputs are valid, the corresponding output from rejection sampling will be stored into FIFO queue 175. The first four coefficients will be sent to memory 170 for polynomial multiplication, while the remaining coefficients will be shifted ahead in the FIFO 175 and used for the next cycle with the valid coefficients from the next cycle.

The maximum depth of FIFO queue in one example is 12 entries. The input can receive up to 8 entities that are ready to use. Four entities will be released in each cycle by sending the output. Hence, if more than eight FIFO queue 175 entries are full, the RejBounded sampling unit 144 does not accept a new input from the random number generator unit 142 by raising a FULL flag 450. However, the FIFO queue 175 has the required valid samples to provide the required output for the next cycle such that throughput is maintained with receiving further input.

In one example, buffer 115 contains 1088/4=272 coefficients. If there is a not FULL condition for reading from random number generator unit 142, all the bits in buffer 115 can be read in 34 cycles. This would match with the random number generator 110 throughput that generates 56 coefficients per 12 cycles. To maximize a hardware resource utilization factor, the random number generator unit 110 will check the buffer 115 status. If the buffer 115 contains eight coefficients or more (the inputs for RejBounded sampling unit 144), an EMPTY flag 455 will not be set, and random number generator 110 will wait until the next cycle.

The maximum number of FULL conditions is when there are no rejected coefficients for all inputs. In this case, after 2 cycles with 16 coefficients, there is one FULL condition. After 64 cycles, all 256 required coefficients are processed by RejBouned sampling unit 144.

To maximize the hardware utilization factor, random number generator unit 142 will check the buffer 115 status. If buffer 115 contains 8 coefficients or more, the EMPTY flag 455 will not be set, and the random number generator 110 will wait until the next cycle.

FIG. 5 is a table 500 illustrating FIFO queue management and status. Column 510 shows a cycle count for rejection sampling. Column 520 shows the corresponding input from buffer 115. Column 530 shows the number of valid entries in the queue 175 from the previous cycle. Column 540 illustrates the total number of valid samples in the queue 175 during the cycle. Output of valid samples from the queue 175 is shown at column 550 and remaining valid entries in the queue 175 after the cycle is shown at column 560.

During the first cycle, cycle count 0, the input is 8, no previous entries exists, the total valid samples is 8, the output is 4, and remaining valid entries for the next cycle is 4. By cycle count 2, the third cycle, the remaining valid entries in column 560 becomes full with 12 entries, and no input from the buffer in the next cycle is received as indicated in column 520 for cycle 3. This pattern repeats a few times where all samples are found valid.

Figure 6:
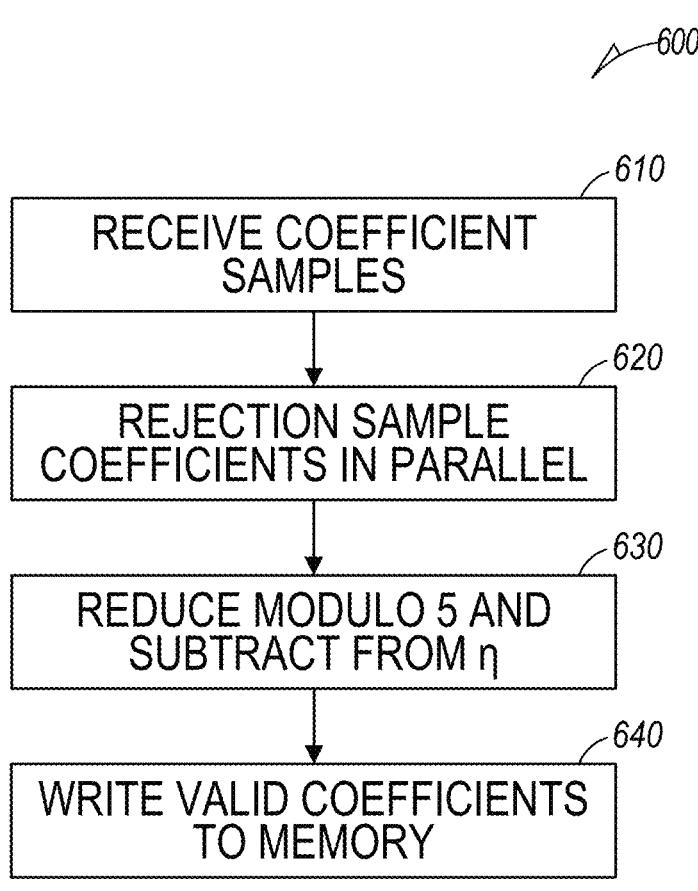
FIG. 6 is a flowchart illustrating a method of performing rejection bounded sampling according to an example embodiment.

FIG. 6 is a flowchart illustrating a method 600 of performing rejection bounded sampling for providing lattice based cryptographic system pseudorandom polynomial coefficients. Method 600 begins at operation 610 by repetitively receiving sets of n coefficient samples of a random bit string, where n is at least eight. The random bit string may be provided by a Keccak random number generator and stored in a parallel in, serial out (PISO) buffer.

In one example, an empty status of the PISO buffer may be monitored during method 600 and in response to the empty status, random bits may be added to the PISO buffer.

Operation 620 repetitively rejection samples the n coefficient samples from a bounded distribution by parallel rejection sampling circuits to identify positive valid samples having a uniform distribution. In one example, rejection sampling comprises RejBounded sampling. The valid coefficient samples, at operation 630, are reduced modulo 5 and the positive valid coefficient samples are subtracted from η, where η=2 or greater to identify valid coefficients. Operation 640 writes the valid coefficients to memory.

The valid samples may be stored in a first in-first out (FIFO) queue having space for 12 four-bit final coefficients. Four valid coefficients are written to memory in operation 640 in response to at least four valid coefficients being stored in the FIFO queue, and in response to more than 8 final coefficients being stored in the FIFO queue, input of further coefficients is delayed for a next cycle of rejection sampling. The valid coefficients are written to memory by a modular multiplexer.

Figure 7:
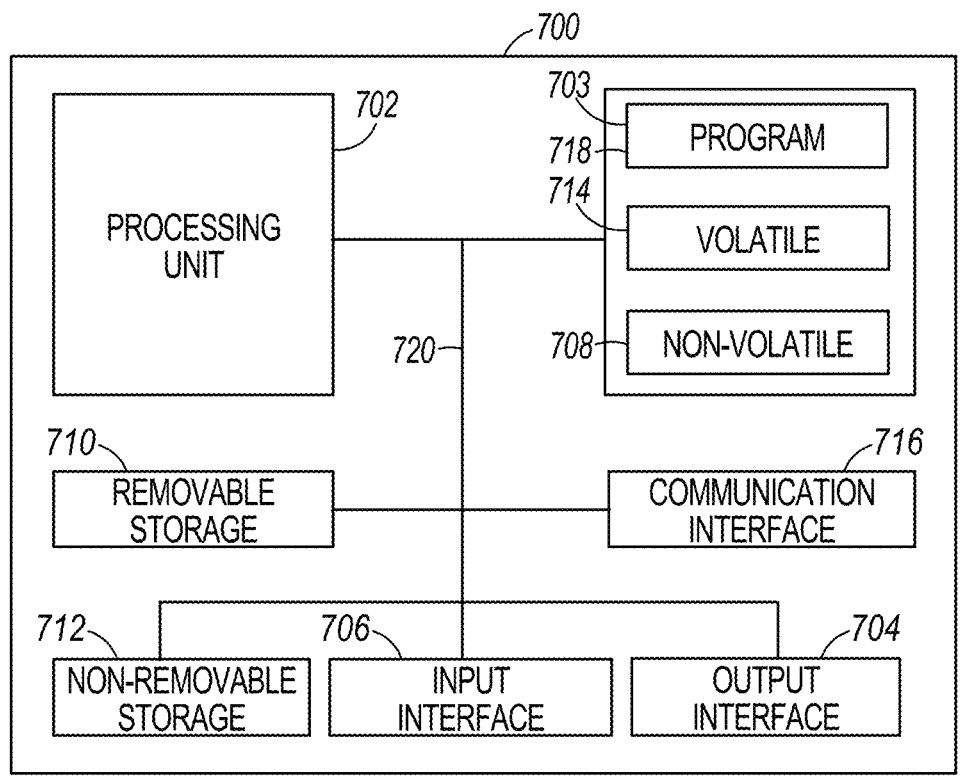
FIG. 7 is a block schematic diagram of a computer system to implement one or more example embodiments.

FIG. 7 is a block schematic diagram of a computer system 700 to implement controller 150 and other components and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD- ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A method for providing lattice based cryptographic system pseudorandom polynomial coefficients includes repetitively receiving sets of n coefficient samples of a random bit string, where n is at least eight, repetitively rejection sampling the n coefficient samples from a bounded distribution by parallel rejection sampling circuits to identify positive valid samples having a uniform distribution, reducing the valid coefficient samples modulo 5 and subtracting the positive valid coefficient samples from $\eta$, where $\eta=2$ or greater to identify valid coefficients, and writing the valid coefficients to memory.

2. The method of example 1 wherein rejection sampling includes RejBounded sampling.

3. The method of example 2 wherein $\eta=2$.

4. The method of any of examples 1-3 wherein the random bit string is provided by a Keccak random number generator.

5. The method of any of examples 1-4 wherein the random bit string is stored in a parallel in, serial out (PISO) buffer prior to receiving sets of n coefficient samples.

6. The method of example 5 and further includes monitoring an empty status of the PISO buffer and in response to the empty status, adding random bits to the PISO buffer.

7. The method of any of examples 1-6 wherein the valid samples are stored in a first in-first out (FIFO) queue having space for 12 four bit final coefficients.

8. The method of example 7 wherein four valid coefficients are written in response to at least four valid coefficients are stored in the FIFO queue, and in response to more than 8 final coefficients being stored in the FIFO queue, input of further coefficients is delayed for a next cycle of rejection sampling.

9. The method of any of examples 1-8 wherein the valid coefficients are written by a modular multiplexer.

10. A cryptographic rejection sampling unit includes n parallel rejection bounded sampling circuits coupled to receive n, four-bit samples in a cycle from a buffer containing a random bit string, where n is an integer having a value of at least 8. A first in-first out queue is coupled to receive valid output from the rejection bounded circuits. A multiplexer is coupled to the queue and configured to provide four valid coefficients in the cycle. A controller is coupled to control valid output provided from the queue to the multiplexer, to track a number of valid outputs in the queue, and to control the multiplexer to output the four valid coefficients. A method uses the cryptographic rejection sampling unit to generate and write the valid coefficients to a memory.

11. The system of example 10 wherein n=4.

12. The system of any of examples 10-11 wherein the queue includes space for 12 valid samples.

13. The system of example 12 wherein the controller is configured to pause receipt of samples from the buffer in response to the queue containing more than 8.

14. The system of any of examples 10-13 and further including a Keccak random number generator configured to provide the random bit string, wherein the buffer comprises a parallel in, serial out (PISO) buffer.

15. The system of example 14 wherein the controller is configured to monitor an empty status of the PISO buffer and in response to the empty status, control the Keccak random number generator to add random bits to the PSIO buffer.

16. The system of any of examples 10-15 wherein the multiplexer includes a modular multiplexer, wherein the valid output from the rejection bounded circuits ranges from $\eta$ to $-\eta$ where $\eta=2$ or greater, and wherein the valid output is used by the modular multiplexer to select the valid coefficients.

17. A cryptographic rejection sampling system includes a random number generator unit that includes a random number generator configured to provide a random bit string based on an input seed and a buffer coupled to the random number generator to store the random bit string. A rejection bounded unit is coupled to the random number generator unit and includes n parallel rejection bounded sampling circuits coupled to receive n, four-bit samples in a cycle from the buffer containing the random bit string, where n is an integer having a value of at least 8, a first in-first out queue coupled to receive valid output from the rejection bounded circuits, a multiplexer coupled to the queue and configured to provide four valid coefficients, and a controller coupled to control valid output provided from the queue to the multiplexer, to track a number of valid outputs in the queue, and to control the multiplexer to output the four valid coefficients.

18. The system of example 17 and further comprising a memory coupled to receive the output of the four valid coefficients and wherein the controller monitors a fullness of the queue and controls whether further samples are received in a next cycle based on the fullness of the queue.

19. The system of any of examples 17-18 wherein the random number generator unit further comprises an input multiplexer having a first input to receive the input seed and a second input coupled to a loop path to feed back the input seed, wherein a same seed is used for the coefficients of one polynomial via the second input coupled to the loop path and is changed for each different polynomial at the first input.

20. The system of any of examples 17-19 wherein the buffer of the random number generator unit includes a full input to control provision of random bits to the buffer in response to controller monitoring of valid output in the queue.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method for providing lattice based cryptographic system pseudorandom polynomial coefficients the method comprising:

repetitively receiving sets of n coefficient samples of a random bit string, where n is at least eight;

repetitively rejection sampling the n coefficient samples from a bounded distribution by parallel rejection sampling circuits to identify positive valid samples having a uniform distribution;

reducing the valid coefficient samples modulo 5 and subtracting the positive valid coefficient samples from $\eta$, where $\eta=2$ or greater to identify valid coefficients; and writing the valid coefficients to memory.

2. The method of claim 1 wherein rejection sampling comprises RejBounded sampling.

3. The method of claim 2 wherein $\eta=2$.

4. The method of claim 1 wherein the random bit string is provided by a Keccak random number generator.

5. The method of claim 1 wherein the random bit string is stored in a parallel in, serial out (PISO) buffer prior to receiving sets of n coefficient samples.

6. The method of claim 5 and further comprising:

monitoring an empty status of the PISO buffer; and in response to the empty status, adding random bits to the PISO buffer.

7. The method of claim 1 wherein the valid samples are stored in a first in-first out (FIFO) queue having space for 12 four bit final coefficients.

8. The method of claim 7 wherein four valid coefficients are written in response to at least four valid coefficients are stored in the FIFO queue, and in response to more than 8 final coefficients being stored in the FIFO queue, input of further coefficients is delayed for a next cycle of rejection sampling.

9. The method of claim 1 wherein the valid coefficients are written by a modular multiplexer.

10. A cryptographic rejection sampling unit comprising:

n parallel rejection bounded sampling circuits coupled to receive n, four-bit samples in a cycle from a buffer containing a random bit string, where n is an integer having a value of at least 8;

a first in-first out queue coupled to receive valid output from the n parallel rejection bounded sampling circuits;

a multiplexer coupled to the queue and configured to provide four valid coefficients in the cycle; and a controller coupled to control valid output provided from the queue to the multiplexer, to track a number of valid outputs in the queue, and to control the multiplexer to output the four valid coefficients.

11. The cryptographic rejection sampling unit of claim 10 wherein n=4.

12. The cryptographic rejection sampling unit of claim 10 wherein the queue includes space for 12 valid samples.

13. The cryptographic rejection sampling unit of claim 12 wherein the controller is configured to pause receipt of samples from the buffer in response to the queue containing more than 8.

14. The cryptographic rejection sampling of claim 10 and further comprising a Keccak random number generator configured to provide the random bit string, wherein the buffer comprises a parallel in, serial out (PISO) buffer.

15. The cryptographic rejection sampling unit of claim 14 wherein the controller is configured to monitor an empty status of the PISO buffer and in response to the empty status, control the Keccak random number generator to add random bits to the PSIO buffer.

16. The cryptographic rejection sampling unit of claim 10 wherein the multiplexer comprises a modular multiplexer, wherein the valid output from the rejection bounded circuits ranges from $\eta$ to $-\eta$ where $\eta=2$ or greater, and wherein the valid output is used by the modular multiplexer to select the valid coefficients.

17. A cryptographic rejection sampling system comprising:

a random number generator unit comprising:

a random number generator configured to provide a random bit string based on an input seed; and a buffer coupled to the random number generator to store the random bit string; and a rejection bounded unit coupled to the random number generator unit, the rejection bounded unit comprising:

n parallel rejection bounded sampling circuits coupled to receive n, four-bit samples in a cycle from the buffer containing the random bit string, where n is an integer having a value of at least 8;

a first in-first out queue coupled to receive valid output from the rejection bounded sampling circuits;

a multiplexer coupled to the queue and configured to provide four valid coefficients; and a controller coupled to control valid output provided from the queue to the multiplexer, to track a number of valid outputs in the queue, and to control the multiplexer to output the four valid coefficients.

18. The system of claim 17 and further comprising a memory coupled to receive the output of the four valid coefficients and wherein the controller monitors a fullness of the queue and controls whether further samples are received in a next cycle based on the fullness of the queue.

19. The system of claim 17 wherein the random number generator unit further comprises an input multiplexer having a first input to receive the input seed and a second input coupled to a loop path to feed back the input seed, wherein a same seed is used for the coefficients of one polynomial via the second input coupled to the loop path and is changed for each different polynomial at the first input.

20. The system of claim 17 wherein the buffer of the random number generator unit includes a full input to control provision of random bits to the buffer in response to controller monitoring of valid output in the queue.

* * * * *